United States Patent
Taylor

(10) Patent No.: US 8,931,807 B2
(45) Date of Patent: Jan. 13, 2015

(54) CONNECTOR

(75) Inventor: Richard Taylor, Cumbria (GB)

(73) Assignee: Balltec Limited (GB)

(*) Notice: Subject to any disclaimer, the term of this patent is extended or adjusted under 35 U.S.C. 154(b) by 597 days.

(21) Appl. No.: 12/516,215

(22) PCT Filed: Nov. 23, 2007

(86) PCT No.: PCT/GB2007/004492
§ 371 (c)(1),
(2), (4) Date: Feb. 3, 2010

(87) PCT Pub. No.: WO2008/062212
PCT Pub. Date: May 29, 2008

(65) Prior Publication Data
US 2010/0133811 A1 Jun. 3, 2010

(30) Foreign Application Priority Data
Nov. 25, 2006 (GB) .................................. 0623517.0

(51) Int. Cl.
*F16L 37/18* (2006.01)
*E21B 17/01* (2006.01)
*F16L 1/26* (2006.01)
*F16L 37/23* (2006.01)

(52) U.S. Cl.
CPC .............. *E21B 17/017* (2013.01); *F16L 1/26* (2013.01); *F16L 37/23* (2013.01)
USPC .......................................... 285/316; 285/308

(58) Field of Classification Search
USPC ............ 285/86, 920, 310, 314–317, 308, 924
See application file for complete search history.

(56) References Cited

U.S. PATENT DOCUMENTS

| 3,695,633 | A |   | 10/1972 | Hanes |
| 3,847,413 | A | * | 11/1974 | Gurley et al. ................. 285/316 |
| 3,918,679 | A | * | 11/1975 | Silvana ...................... 251/149.1 |
| 4,366,945 | A | * | 1/1983 | Blauenstein ............... 251/149.6 |
| 4,437,647 | A | * | 3/1984 | Cruse ......................... 251/149.9 |
| 4,483,510 | A | * | 11/1984 | Palau et al. ................ 251/149.6 |
| 4,703,958 | A | * | 11/1987 | Fremy ............................ 285/316 |
| 5,290,009 | A | * | 3/1994 | Heilmann .................. 251/149.6 |
| 5,390,963 | A | * | 2/1995 | Namekawa ....................... 285/86 |
| 5,413,309 | A | * | 5/1995 | Giesler ....................... 251/149.9 |
| 5,451,031 | A | * | 9/1995 | Purvis et al. ................. 251/89.5 |
| 5,630,570 | A | * | 5/1997 | Lacroix et al. ............. 251/149.9 |

(Continued)

FOREIGN PATENT DOCUMENTS

GB 2 411 445 8/2005

*Primary Examiner* — Aaron Dunwoody
(74) *Attorney, Agent, or Firm* — Salter & Michaelson

(57) ABSTRACT

A connector for use as a bend stiffener in a marine application comprising male and female connectors respectively provided with a downwardly dependent frusto-conical extension and a cylindrical extension. The female connector includes a hollow cylindrical body defining a through bore and surrounded by a spring loaded sleeve movable axially with respect to the body. Spring loaded latches extend through respective apertures to coact with grooves in the body. Hydraulic rams are disposed to push the sleeve against the spring loading which brings an internally wider diameter position of the sleeve adjacent locking balls extending through but retained by stepped apertures. The latches, rams and locking balls coact to lock the male and female connectors together or to enable their release and thus the locking together or release from that locking together of connected extensions. This in turn facilitates the operation of the connector in hazardous conditions.

10 Claims, 2 Drawing Sheets

(56) References Cited

U.S. PATENT DOCUMENTS

| | | | |
|---|---|---|---|
| 6,095,570 A * | 8/2000 | Hagen et al. | 285/93 |
| 6,131,961 A * | 10/2000 | Heilmann | 285/316 |
| 6,217,080 B1 * | 4/2001 | Imai | 285/13 |
| 6,412,828 B1 * | 7/2002 | Lacroix et al. | 285/316 |
| 6,511,100 B1 * | 1/2003 | Le Clinche | 285/316 |
| 6,568,717 B1 * | 5/2003 | Le Clinche | 285/315 |
| 6,779,778 B2 * | 8/2004 | Kuwabara | 251/149.9 |
| 6,840,548 B2 * | 1/2005 | Lacroix | 285/308 |
| 6,926,312 B2 * | 8/2005 | Lacroix et al. | 285/317 |
| 7,007,983 B2 * | 3/2006 | Arosio | 285/316 |
| 7,028,711 B1 | 4/2006 | Scott | |
| 7,472,930 B2 * | 1/2009 | Tiberghien et al. | 285/316 |
| 7,487,837 B2 * | 2/2009 | Bailey et al. | 166/345 |
| 7,661,725 B2 * | 2/2010 | Kouda | 285/316 |
| 7,673,911 B2 * | 3/2010 | Liu | 285/316 |
| 7,753,415 B2 * | 7/2010 | Tiberghien et al. | 285/316 |
| 7,762,593 B2 * | 7/2010 | Le Bars et al. | 285/316 |
| 7,926,855 B2 * | 4/2011 | Kitagawa | 285/316 |
| 7,938,456 B2 * | 5/2011 | Chambaud et al. | 285/316 |

* cited by examiner

US 8,931,807 B2

CONNECTOR

TECHNICAL FIELD

The present invention relates to a connector.

BACKGROUND OF THE INVENTION

There is a need for a heavy duty connector which permits engagement and disengagement without the use of human operatives in hazardous or extreme conditions. Such conditions are to be found, for example, in a marine environment where connectors may be expected to operate in extreme weather conditions and/or underwater. Connectors may have many different applications. One such application is as a bend stiffener preventing kinking of a line extending through it. An existing example of a bend stiffener is described in GB 2411445A but the arrangement described requires the assembly of a two part collar which in turn requires the attention of operatives.

It is an object of the invention to provide a connector which permits engagement and disengagement as outlined above.

SUMMARY OF THE INVENTION

According to one aspect of the present invention there is provided a connector adapted for use with a complementary connector, the connector comprising locking means having operative and inoperative positions in relation to the complementary connector, release means operative to permit or prevent the locking means to move between operative and inoperative positions, means for retaining the release means in permissive position and means for moving the release means between permissive and preventative positions.

According to another aspect of the present invention there is provided a connector adapted for use with a complementary connector, the connector comprising a body having formations adapted to receive locking means of the complementary connector.

According to a further aspect of the present invention there is provided a connector assembly comprising complementary connectors one of the connectors having locking means having operative and inoperative positions in relation to the complementary connector, the connector comprising locking means having operative and inoperative positions in relation to the complementary connector, release means operative to permit or prevent the locking means to move between operative and inoperative positions, means for retaining the release means in permissive position and means for moving the release means between the permissive and preventative positions.

In a preferred embodiment of the invention, the locking means comprises one or more balls. The balls advantageously extend through apertures in one connector into a formation in the other connector. The formation may be a groove or a series of part spherical recesses. The release means advantageously comprises a sleeve coaxially surrounding a body of the connector and axially movable in relation thereto. The sleeve is preferably spring loaded and the means for moving preferably comprises one or more pressure fluid operable rams. The or each ram may be pneumatic or hydraulic. The means for retaining the release means in a permissive position comprises one or more latches. The sleeve may be spring loaded by nitrogen gas springs or by conventional springs.

DESCRIPTION OF THE DRAWINGS

In order that the invention may be more clearly understood, one embodiment thereof will now be described, by way of example, with reference to the accompanying drawings, in which.

DETAILED DESCRIPTION

Figure 1:
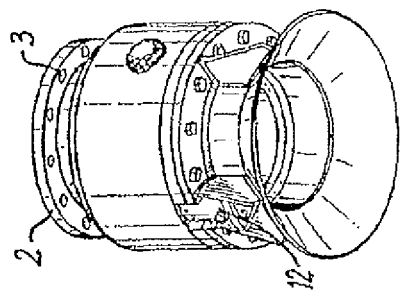
FIG. 1 is a side elevational view partly broken away of a female connector.
Figure 2:
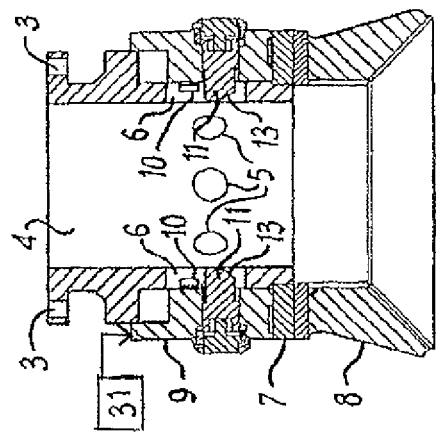
FIG. 2 is a cross sectional view taken along the line A-A of FIG. 1 of the connector of FIG. 1.
Figure 3:
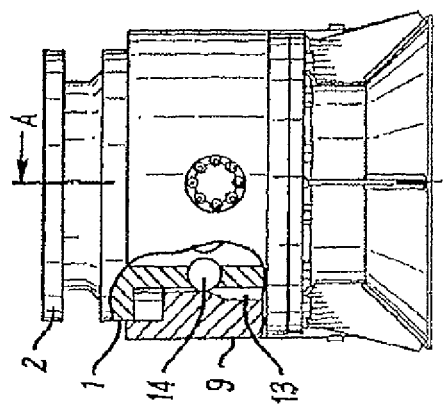
FIG. 3 is a perspective view to a different scale of the connector shown in FIGS. 1 and 2.
Figure 4:
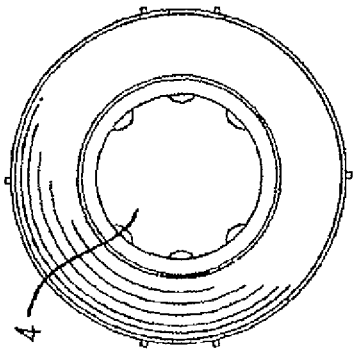
FIG. 4 is an underplan view of the connector shown in FIGS. 1, 2 and 3.

Referring to FIGS. 1 to 4, the female connector comprises a hollow substantially cylindrical body 1. The body 1 incorporates a flange 2 at one end defining a number of through apertures 3 to enable the body to be bolted to another part (not shown). The body 1 forms the main structural component of the connector and defines an axially extending through bore 4. Extending through the wall of the body 1 are a plurality of circumferentially equidistantly spaced stepped apertures 5 for a purpose to be described later. Two diametrically opposed grooves 6 are also formed in the body 1 again for a purpose to be described later.

At the axial end of the body 1 remote from flange 2 is a further flange 7 Concentrically disposed with respect to the body 1. Affixed to this lower flange 7 is a guide cone 8. Concentrically surrounding the body 1 is a spring loaded sleeve 9 which is movable axially with respect to the body 1 and has an axial length less than that of the body 1. The spring loading is provided by nitrogen gas springs but conventional springs may be used. See the spring mechanism 31 in FIG. 2. The spring mechanism 31 may be comprised of a nitrogen gas spring or a conventional spring. Two diametrically opposed apertures 10 are formed in the wall of the sleeve and are aligned with the grooves 6 formed in the body 1. Spring loaded latches 11 extend through respective apertures 10 and coact respectively with grooves 6. Two hydraulic rams 12 (only one shown in FIG. 3) are disposed to push the sleeve 9 against the spring loading upwardly (looking at FIGS. 1 to 3). This action brings an internally wider diameter portion of the sleeve 9 adjacent locking balls 14 extending through but retained by stepped apertures 5. This upward movement of the sleeve 9 enables spring loaded latches 11 to engage in grooves 6 in the body 1 locking the sleeve 9 axially with respect to the body 1.

Figure 5:
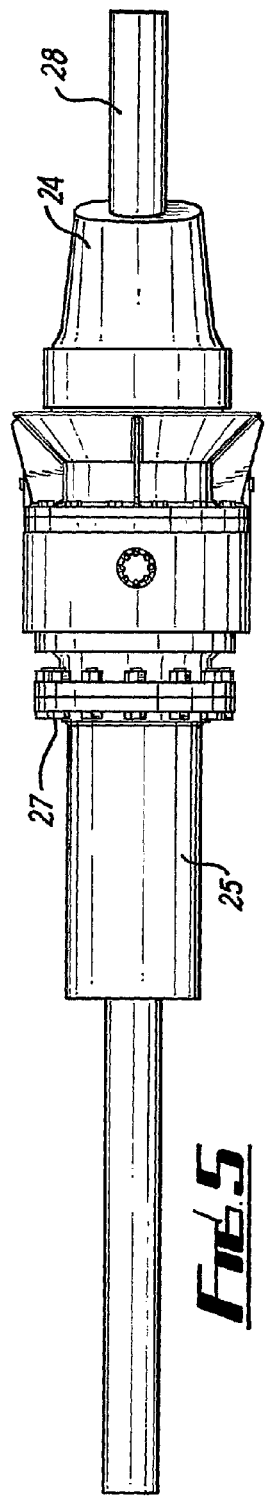
FIG. 5 is a side elevational view of the connector of FIG. 1 connected with a male connector and in use as a bend stiffener on a line.
Figure 6:
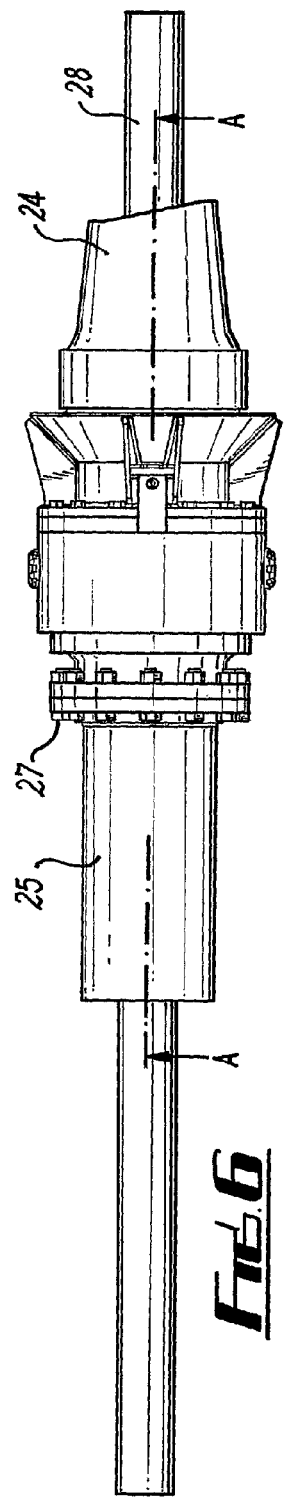
FIG. 6 is a front elevational view of the arrangement of FIG. 5.
Figure 7:
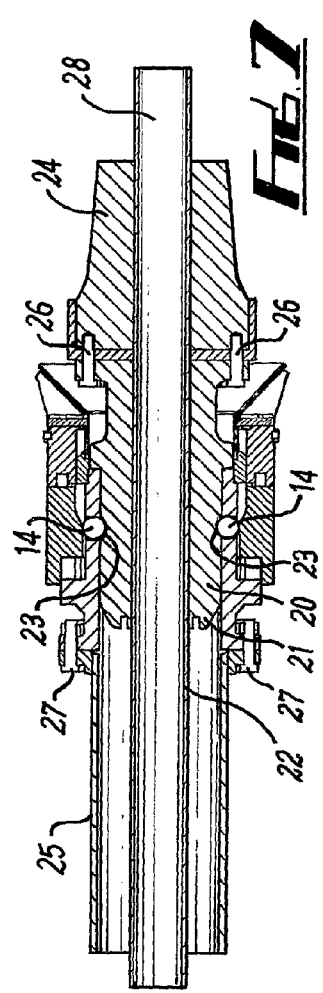
FIG. 7 is a cross sectional view along the line A-A of FIG. 6.

In this position the above described female connector is ready to receive a complementary male connector. Referring additionally to FIGS. 5 to 7 a male connector comprising a body 20 having a chamfered end 21 and defining an internal through bore 22 is inserted into the female connector described with reference to FIGS. 1 to 4. At the point of insertion, the male connector is guided by the diverging walls of the guide cone 8. As insertion progresses, the chamfered end 21 meets chamfered faces 13 of the latches 11 pushing those latches radially outwardly against their spring loading and out of their respective grooves releasing the sleeve 9 with respect to the body 1.

The released sleeve 9 moves axially downwardly (viewed in FIGS. 1 to 3) under the action of the nitrogen gas springs 5 with respect to the body 1. The body 20 of the male connector is formed either with a circumferentially extending groove or a series of circumferentially spaced part spherical pockets 23. As the sleeve 9 moves under the action of the nitrogen springs a ramp between internally lesser and greater diameter portions of the sleeve rides over the locking balls 14 pressing them through the respective corresponding apertures in the body 1 to snap into the groove or pockets 23 formed in the body 20 of the male connector locking the male and female connectors together. To enable release hydraulic fluid is once again supplied to the hydraulic rams 12 pushing the sleeve 9 upwardly and in turn releasing the locking balls 14 which in turn allows the male connector to drop out of the female connector.

The particular application of the connector shown in FIGS. 5 to 7 is as a bend stiffener. As a connector which provides for automatic engagement and disengagement, however, the connector has general application, and provides particular advantages in hazardous and/or remote locations such as in marine application where manual engagement/disengagement may be difficult and/or hazardous. In the bend stiffener application shown, the male connector is provided with a downwardly dependent extension 24 frusto conical in shape and the female connector is provided with a cylindrical extension 25. In both cases the extensions are connected to their respective connectors by means of a series of bolts 26, 27 extending through corresponding apertures formed in the flanges on those connectors. The bend stiffener resists any tendency of a line 28 extending through it to kink at the point at which it is entering a sea or land based production platform.

It will be appreciated that the above embodiments have been described by way of example only and that many variations are possible within the scope of the invention. The number of locking balls and corresponding recesses may be varied as desired as may be the number of rams and latches. The rams may be hydraulic or pneumatic.

What is claimed is:

1. A connector comprising:
    a connector body;
    locking means comprising at least one locking device including a rounded surface and having operative and inoperative positions in relation to the connector body;
    said connector body having at least one accommodating aperture in a connector body wall adapted to receive the at least one locking device rounded surface;
    a sleeve mounted coaxially relative to the connector body and axially movable in relation to the connector body;
    said sleeve selectively engageable with the locking means and having a permissive position in which the locking means moves between operative and inoperative positions and a preventative position in which the locking means is prevented from moving between operative and inoperative positions;
    a spring mechanism connected with the sleeve and for biasing the sleeve toward the preventative position;
    a retainer comprised of at least one latch couplable between the connector body and sleeve and for retaining the sleeve in the permissive position; and
    an actuator mechanism coupled with said sleeve for moving the sleeve between permissive and preventative positions by pushing the sleeve against the spring mechanism biasing, wherein the sleeve is lockable in the preventative position by the retainer and wherein the retainer is moved to an unlocked position to permit the sleeve to move from the permissive position to the preventative position.

2. A connector as claimed in claim 1 wherein the retainer engages the sleeve to lock the sleeve in the permissive position and wherein the retainer is disengaged from the sleeve to permit the sleeve to move from the permissive position to the preventative position.

3. A connector as claimed in claim 1 in which the locking device comprises one or more locking balls.

4. A connector as claimed in claim 1, in which the actuator mechanism comprises at least one pressure fluid operable actuator.

5. A connector as claimed in claim 4, in which the or each pressure fluid operable actuator is pneumatic.

6. A connector as claimed in claim 4, in which the or each pressure fluid operable actuator is hydraulic.

7. A connector as claimed in claim 1, in which the retainer comprises one or more latches.

8. A connector as claimed in claim 1, in which the locking device comprises one or more locking balls, and in which the one or more balls extend through the aperture in one connector and into an aperture in another connector.

9. A connector as claimed in claim 1, in which the aperture is a groove.

10. A connector as claimed in claim 1, in which the aperture is a series of part spherical recesses.

\* \* \* \* \*